3,057,837
Patented Oct. 9, 1962

3,057,837
PROCESS FOR ADDITION POLYMERIZATION
John D. Calfee, Dayton, Ohio, assignor to Monsanto Chemical Company, St. Louis, Mo., a corporation of Delaware
No Drawing. Filed Jan. 16, 1958, Ser. No. 709,205
11 Claims. (Cl. 260—93.7)

This invention relates to the production of high molecular weight polymers by the addition polymerization of ethylenically unsaturated monomers in a system employing catalyst compositions containing very finely divided aluminum fluoride.

An object of this invention is to provide a process for the polymerization of olefins that have a methylene group doubly bonded to carbon to prepare high molecular weight polymers.

Another object of this invention is to prepare solid polymers of ethylene of high molecular weight under moderate reaction conditions.

A further object of this invention is to provide a process of addition polymerization employing a heterogeneous catalyst system operable over a wide range of temperatures and pressures.

There have been attempts by investigators to polymerize ethylene by $AlF_3$ catalysis, for example, as described in British Patent 478,601. Only low molecular weight polymers were obtained boiling below 200° C. By practicing my invention I have been able to prepare very high molecular weight solid polymers from ethylene, which have not been obtainable from $AlF_3$ catalysis prior to my invention.

There are many reports in the chemical literature of the study of Friedel-Crafts catalysts for the polymerization of ethylene at moderate pressures and temperatures. Low molecular weight oils were generally obtained. Under conditions necessary to obtain polymer formation side reactions took place concurrently. Thus, hydrogenation-dehydrogenation of the polymer chain occurred along with polymerization. In addition, polymer olefins, as such or at the moment of formation, are subject to cyclization, intramolecular alkylation, and isomerization. The overall phenomenon (polymerization conjoined with hydrogen disproportionation) is recognized as "conjunct polymerization," and has been described by Ipatieff and Gross in the Journal of the American Chemical Society, vol. 58, page 915 (1936).

An object of this invention is to provide catalysts having no activity, or greatly reduced activity, as conjunct polymerization catalysts, but having unexpected activity in polymerizing monomers to high molecular weight polymers. Catalyst-systems particularly effective in polymerizing ethylene, propylene, styrene, and ring-substituted styrenes to high molecular weight polymers are embodied in my invention.

Solid polymeric products produced by my invention from ethylene are well known articles of commerce. These products find widespread applications as plastic sheet or film and are useful in the manufacture of castings, moldings, and fibers.

Commercial aluminum fluoride consists of a mixture of aluminum fluoride, hydrated aluminum fluoride, and basic aluminum fluorides generally characterized by the presence of crystals of relatively large size, about 2500 Angstrom units radius. This material is unsuitable for the practice of my invention. I have discovered that aluminum fluoride prepared under anhydrous conditions through the action of fluorinating agents is an active polymerization catalyst. Catalyst so prepared is characterized by the presence of sub-microscopic crystals, hereinafter referred to as "crystallites."

When $AlF_3$ is prepared according to the examples I have described below, material is obtained which appears to have a non-crystalline or "amorphous" structure when examined under a high-powered optical microscope. However, X-ray diffraction technique shows the presence of sub-microscopic crystals or, "crystallites." These crystallites have a radius of 500 Angstrom units and lower. I have found that the catalyst activity is directly related to the crystallite radius. When the radius of the crystallites is further reduced to 200 Angstroms or lower the catalyst is most effective. Crystallite size has been determined by the technique of X-ray diffraction line broadening and has been confirmed by electron microscopy.

Aluminum fluoride of a crystallite size of less than 500 Angstrom units radius can be conveniently prepared by the reaction of excess ethylidene fluoride, $CH_3CHF_2$, with anhydrous aluminum chloride dissolved in ethyl chloride. The chlorine atoms in crystalline $AlCl_3$ are replaced by the much smaller fluorine atoms during the reaction without destroying the lattice structure. As a result, the $AlF_3$ is porous and possesses a great surface area and appears amorphous when viewed with a high-powered optical microscope. This material has been found to have the desired crystalline structure and a crystallite radius of less than 500 Angstrom units.

Aluminum fluoride suitable as a catalyst for the polymerization of monomers containing a methylene group doubly bonded to carbon to high molecular weight polymers can be made by the reaction of certain fluorine-containing compounds with an aluminum halide. Aluminum chloride, aluminum bromide, and aluminum iodide can all be used as starting materials for the preparation of aluminum fluoride. Aluminum chloride is preferred for reasons of economy in operating practice. When starting with aluminum chloride I prefer to use a volatile, non-complexing solvent for the said aluminum chloride; methyl chloride and ethyl chloride are excellent examples of the desired solvent. Under anhydrous conditions hydrogen fluoride, boron trifluoride, and benzotrifluoride, $C_6H_5CF_3$, have all been used successfully to convert $AlCl_3$ to $AlF_3$ having a crystallite radius of 500 Angstrom units or less.

Aluminum fluoride prepared by the reaction of ethylidene fluoride with aluminum chloride retains trace quantities of by-product polymer on the catalyst surface. The catalyst made by the $BF_3$ synthesis method retains a small amount of adsorbed boron halide. The presence of such boron halide is not objectionable, and as a matter of fact in conjunction with the active crystallite form of aluminum fluoride, possesses activity as a co-catalyst for the polymerization reaction.

In my preferred method of preparing aluminum fluoride having a crystallite radius of less than 500 Angstrom units, the fluorine-containing compound is slowly added to a saturated solution of $AlCl_3$ in a lower alkyl chloride, for example, ethyl chloride cooled to about 0° C. The $AlF_3$ precipitates as formed and is so finely divided, absorptive, and of such high surface area that a gel results. Removal of the solvent, the by-product chlorine-containing compound, and the excess fluorine-containing reactant under reduced pressure leaves a dry, free-flowing, finely divided powder. The active catalyst retains trace quantities of organic chloride adsorbed on its surface. This material also has no adverse effects on the activity of the catalyst.

I have found that active catalyst of crystallite radius of less than about 500 Angstrom units radius can be prepared employing an alternative method of isolation. The gel-like material as previously described is added to an inert, saturated aliphatic hydrocarbon diluent. The alkyl halide, by-product chloride, and excess fluorine-containing reactant are then volatilized from the diluent and the catalyst obtained as an extremely finely-divided dispersion in the hydrocarbon diluent. The catalyst prepared by these methods for use for polymerization reactions is so finely divided that the dispersion appears turbid and settles out very slowly.

In practicing my invention I have found that inert diluents can be used, if desired, for the polymerization of various monomers. The diluent has some utility in controlling the rate and temperature of reaction, it tends to prevent the deposition of solid polymer on the surface of the catalyst and on the stirring apparatus and walls of the reactor. Inert diluent may be useful in separating the desired polymer from the catalyst during the product isolation step. Saturated aliphatic hydrocarbons, for example, hexane, octane, nonane, decane, etc., and aromatic compounds, e.g., benzene, toluene, xylenes, can be utilized as inert diluents.

Besides the inert liquid diluent used as a dispersant in the reactor it may be advantageous to use an inert gaseous diluent for the monomer. Lower molecular weight saturated hydrocarbons, for example, ethane, propane, and butane have been used successfully.

In addition to my discovery that aluminum fluoride of crystallite radius of less than 500 Angstrom units is useful in polymerizing ethylene to solid, high molecular weight polymer, according to the teaching of this invention, other monomers can be polymerized to high molecular weight polymers. Ethylenically unsaturated monomers suitable for the practice of my invention include propylene, 1-butene, isobutylene, 1-pentene, 1-hexene, and 1-octene. Ethylenically unsaturated compounds containing an aromatic ring substituent are further embodiments of one aspect of my invention, including the compounds, broadly called styrenes, which include styrene, o-methylstyrene, p-methylstyrene, p-chlorostyrene, m-ethylstyrene, o-iso-propylstyrene and p-butylstyrene. Thus the term styrenes is meant to include styrene and its chloro- and alkyl-ring-substituted derivatives.

I have demonstrated that aluminum fluoride of crystallite radius of less than about 500 Angstrom units can serve as the sole catalyst for the polymerization process of my invention; however, the catalyst activity may be further enhanced, if desired, by the addition of an active halide compound. The mechanism of action of these compounds is not fully understood, but it has been described as a co-catalytic or activation effect. The reaction rate and conditions of temperature and pressure may be modified by the addition of one or more of these active halide compounds which serve as co-catalysts or activators in the polymerization systems. Typical examples of the active halide compounds include antimony pentachloride, antimony trichloride, boron trifluoride, tin tetrachloride, silicon tetrachloride, titanium tetrachloride, titanium trichloride, ferric chloride, aluminum bromide, chromium trichloride, zirconium tetrachloride, and zinc chloride. I prefer to use antimony pentachloride, antimony trichloride, boron trifluoride, tin tetrachloride, silicon tetrachloride, titanium tetrachloride, and titanium trichloride. I prefer to use about 1 part by weight of finely divided aluminum fluoride per 0.1 to 20 parts by weight of co-catalyst; however, this ratio can be varied widely according to the monomer used, and as the reaction conditions are changed.

The practice of my invention is not limited to intermittent or batch-type operation. The catalysts described herein can be deposited on an inert carrier, e.g., alumina, carbon, silica, or asbestos or mixtures thereof and the ethylenically unsaturated monomer, diluted with an inert carrier passed over the catalyst. If desired, the catalyst suspended in an inert diluent can be fed concomitantly with the monomer into the polymerization chamber. Other aspects of continuous operation will be obvious to one skilled in the art. For example, since one form of preferred catalyst is a fine powder that flows like a liquid, the polymerization reactor can be modified so that catalyst and monomer may be fed concomitantly into the reactor containing an inert hydrocarbon liquid as diluent.

Another advantage of my invention becomes apparent after consideration of the examples I have included herein, namely, that the process of polymerization does not depend upon a critical narrow range of temperatures or pressures for operability. I have demonstrated that polymer can be produced at temperature as low as −70° C. and as high as 250° C. Polymer has also been obtained by operation at atmospheric pressure and at pressures ranging upwardly to 4000 p.s.i.

While the polymerization of ethylene to produce solid polymers in the presence of the catalysts herein disclosed can be carried out under extremely mild conditions as stated in the preceding paragraph, it is preferable from an economic standpoint to employ moderately high pressures, especially for ethylene polymerization, suitably from 10 to 200 atmospheres or higher, in order to facilitate the handling of ethylene. Much higher pressures, up to several thousand atmospheres, can be employed, but it is not economically desirable to do this in view of the extraordinary activity of the catalysts at lower pressures. Similarly, extremely low temperatures may be employed. The preferred temperatures, however, are within the range of about 0° C. to 300° C.

In order to illustrate some of the various aspects of the invention and to serve as a guide in applying the invention the following specific examples are given. It will, of course, be understood that variations from the particular temperatures, pressures, diluents and proportions can be made without departing from the invention.

*Example 1*

A glass reactor immersed in a cooling bath was charged with a saturated, clear solution of AlCl$_3$ in ethyl chloride. The temperature was maintained below 0° C. as ethylidene fluoride, CH$_3$CHF$_2$, was added in excess of the quantity required to convert all the AlCl$_3$ to AlF$_3$. Rate of reaction was followed by observing gel formation as AlF$_3$ was obtained. The low-boiling materials were volatilized from the system under reduced pressure as the temperature was increased to room temperature. Volatile material was removed as the product was subjected to a vacuum of <1 mm. mercury for 48 hours. The resulting aluminum fluoride was obtained as a very finely divided free-flowing powder in essentially quantitative yield based on aluminum chloride charge. Crystallite size of the catalyst prepared according to this procedure has been found to be less than about 200 Angstrom units in radius, as determined by the technique of X-ray diffraction line broadening.

*Example 2*

A solution of 50 g. aluminum chloride dissolved in 1000 ml. ethyl chloride cooled to −78° C. was treated with an excess of BF$_3$ for the reaction

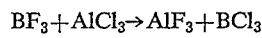

The BF$_3$ dissolved readily and the solution was permitted to warm up. At about 0° C. sudden reaction occurred with the solution being converted to a thick gel. Solvent and low-boiling by-products were removed by volatilization under reduced pressure at room temperature. Traces of volatile materials were removed by storing the product for 16 hours at <1 mm. Hg. A very fine powder that had liquid flow characteristics was obtained having a crystallite radius of less than 500 Angstrom units.

*Example 3*

In a manner similar to Example 2, AlCl$_3$ in ethyl chloride was treated with gaseous hydrogen fluoride. After solvent and volatile by-products were removed under reduced pressure the $AlF_3$ was recovered as a porous, somewhat granular powder. This catalyst was pulverized to a fine free-flowing powder by grinding in a ball mill. Crystallite size determined by X-ray diffraction technique, and confirmed by electron microscopy, was less than 500 Angstrom units in radius.

*Example 4*

Catalyst prepared according to Example 1, 17.0 g. $AlF_3$, was charged to a 1-liter autoclave along with 500 ml. hexane as an inert diluent. Ethylene was then charged to the autoclave to 1700 p.s.i. at room temperature. The autoclave was then warmed, while shaking in a rocking mechanism, to 80° C. under autogenous pressure for 3 hours. The excess ethylene was vented, and polymer separated from catalyst to obtain a solid, crystalline waxy polyethylene and a smaller proportion of lower molecular weight polymer as oil.

*Example 5*

Catalyst from Example 2 was placed in a flask which was closed and evacuated. Ethylene was slowly bled into the reactor to atmospheric pressure. The system was connected to a mercury manometer and flow of ethylene adjusted to maintain pressure over the catalyst equivalent to atmospheric pressure. Even at room temperature and atmospheric pressure, the polymerization proceeded so rapidly that the catalyst became warm and was soon coated with polymer. Product polymer was recovered as a mixture of high molecular weight polyethylene wax and a small proportion of low molecular weight oil by dissolving out the catalyst in boiling dilute hydrochloric acid.

*Example 6*

Into an apparatus similar to that used in Example 5 was charged dry aluminum fluoride catalyst of Example 2. The reactor was evacuated and propylene fed into the system until atmospheric pressure was reached. Absorption of propylene was greater than for ethylene and heat was liberated as a layer of polymer was built up on the catalyst surface. The catalyst was washed away from the polymer with dilute, boiling hydrochloric acid and a high molecular weight polypropylene polymer was recovered.

*Example 7*

A sample of aluminum fluoride catalyst of Example 3, 10 g., was charged to an autoclave along with 100 ml. hexane and the autoclave pressurized with ethylene. The autoclave was heated to 250° C. at which temperature the internal pressure rose to 4000 p.s.i. After 3 hours the vessel was cooled to room temperature and vented. The catalyst was coated with carbon indicating a very high degree of catalyst activity. The product obtained consisted of high molecular weight polyethylene wax and a smaller proportion of polymeric oils. Significantly, there was no sludge formation which is characteristic of aluminum chloride catalysis under these conditions.

*Example 8*

A 200 ml. capacity autoclave was charged with 2 g. finely divided aluminum fluoride similar to catalyst prepared in Example 1, 2 ml. $TiCl_4$, and pressured to 200 p.s.i. with ethylene at room temperature. The autoclave was heated to 150° C. for 7 hours, then cooled and vented. The catalyst was quenched with acetone and leached with hot aqueous HCl. The polymer obtained was insoluble in hot acetone but soluble in boiling toluene. The product obtained from this polymerization was a solid, high molecular weight polyethylene polymer.

*Example 9*

A small autoclave was charged with 2.0 g. finely divided $AlF_3$, prepared in Example 1, 40 ml. hexane, and 0.5 ml. $TiCl_4$. Ethylene was used to pressurize the autoclave to 325 p.s.i. at room temperature and the autoclave was then heated to 200° C. and agitated in a rocking mechanism for 2 hours. The vessel was then cooled to 25° C. and the pressure was observed to be only 50 p.s.i. indicating polymer formation. The polymer was worked up by washing with acetone, boiling dilute HCl, and water. Last traces of catalyst were then removed by precipitating the polymer from hot kerosene solution with isobutanol. This solid, high molecular weight polyethylene polymer was molded at 170° C. to form a tough, flexible film.

*Example 10*

The autoclave was charged with 50 ml. kerosene, 5 g. $AlF_3$, prepared in Example 3, 1 g. $TiCl_4$ and pressurized with ethylene to 600 p.s.i. After standing for 1 hour at room temperature the excess ethylene was vented and the autoclave opened. The solid catalyst was found to be coated with solid high molecular weight polyethylene polymer. This run illustrates the excellent activity of the catalyst at room temperature at short contact time and without agitation.

*Example 11*

Into a small autoclave was charged 2.0 g. $AlF_3$ finely divided catalyst prepared in Example 1, 0.5 ml. $TiCl_4$, 40 ml. hexane and 20 g. propylene. The autoclave was then heated in a rocking device for 2 hours at 200° C. The vessel was then cooled to room temperature and opened. The propylene had been quantitatively converted to a thick oil. This product oil was extracted with acetone and then precipitated from hot hexane by excess acetone. A quantity of solid polypropylene polymer having a tacky character was obtained by this technique.

*Example 12*

The small autoclave was charged with 2.0 g. finely divided aluminum fluoride prepared in Example 1, 0.5 ml. silicon tetrachloride, 40 ml. hexane, and ethylene to a pressure of 350 p.s.i. While the vessel was held at room temperature for 16 hours, the pressure dropped 75 p.s.i. indicating progress of the polymerization at room temperature. The autoclave was then heated to 200° C. for 2 hours in the rocking mechanism. At 200° C. the initial pressure was 800 p.s.i. but as polymerization occurred the pressure dropped to 475 p.s.i. during the 2 hour period. The product from the autoclave contained solid polyethylene polymer with some oily polymer. The solid polymer was of high molecular weight as it dissolved in boiling toluene and precipitated as the toluene cooled or upon the addition of acetone. The polymerization run demonstrates the activity of $SiCl_4$ as a co-catalyst when used with finely divided aluminum fluoride.

*Example 13*

The small autoclave was charged with 5 g. finely divided aluminum fluoride, prepared according to the procedure of Example 2, 1 g. antimony trichloride, 25 ml. hexane and ethylene to 500 p.s.i. pressure at room temperature. The autoclave was heated to 100° C. in a rocking mechanism and permitted to cool to room temperature. The solid polyethylene polymer isolated from this run was of sufficient molecular weight to be film-forming when molded.

*Example 14*

This polymerization example was designed to serve as a control in comparison with Example 13, whereby aluminum chloride was used instead of aluminum fluoride. The charge to the autoclave consisted of 5 g. aluminum chloride, 1 g. antimony trichloride, 25 ml. hexane and ethylene to 500 p.s.i. pressure at room temperature. Heat was liberated indicating rapid reaction (polymerization). The autoclave was opened and found to contain a catalyst sludge and a viscous oily polymer with no solid polyethylene being formed. This run indicates that aluminum chloride catalyzes conjunct polymerization and is unsuitable under these conditions for polymerizing ethylene to a high molecular weight, solid polymer.

While the invention has been described with particular reference to preferred embodiments thereof, it will be appreciated that variations from the details given herein can be effected without departing from the invention in its broadest aspects.

I claim:

1. A process of polymerizing a monomer containing a methylene group doubly bonded to carbon and selected from the group consisting of aliphatic hydrocarbon monoolefins containing from 2 to 8 carbon atoms and styrene to high molecular weight polymers which comprises contacting said monomer with a catalyst consisting essentially of aluminum fluoride having a crystallite size of less than about 500 Angstrom units radius, and isolating said polymer therefrom.

2. A process of polymerizing monomers containing a methylene group doubly bonded to carbon and selected from the group consisting of aliphatic hydrocarbon monoolefins containing from 2 to 8 carbon atoms and styrene to high molecular weight polymers by employing as the active polymerization catalyst a composition consisting essentially of one part aluminum fluoride having a crystalite radius of less than about 500 Angstrom units in combination with 0.1 to 20 parts by weight of a co-catalyst selected from the group consitsing of antimony pentachloride, antimony trichloride, boron trifluoride, tin tetrachloride, titanium tetrachloride, titanium trichloride, silicon tetrachloride, ferric chloride, aluminum bromide, chromium trichloride, zirconium tetrachloride, and zinc chloride.

3. In the polymerization of ethylene to high molecular weight, solid polyethylene polymer, the improvement which comprises employing as the active polymerization catalyst a composition consisting essentially of one part aluminum fluoride having a crystallite size of less than about 500 Angstrom units radius and 0.1 to 20 parts by weight of a co-catalyst selected from the group consisting of antimony pentachloride, antimony trichloride, boron trifluoride, tin tetrachloride, titanium tetrachloride, titanium trichloride, silicon tetrachloride, ferric chloride, aluminum bromide, chromium trichloride, zirconium tetrachloride, and zinc chloride.

4. In the polymerization of ethylene to high molecular weight, solid polymer, in the presence of an inert hydrocarbon diluent, the improvement which comprises employing a catalyst consisting essentially of aluminum fluoride having a crystallite radius of less than about 500 Angstrom units.

5. In the polymerization of ethylene to high molecular weight solid polymer, the improvement which comprises employing a catalyst consisting essentially of aluminum fluoride having a crystallite radius of less than about 200 Angstrom units.

6. The process of polymerizing ethylene which comprises contacting ethylene with a catalyst consisting essentially of aluminum fluoride having a crystallite radius of less than about 500 Angstrom units and titanium tetrachloride, in the presence of an inert hydrocarbon diluent, and recovering solid polyethylene polymer therefrom.

7. The process of polymerizing ethylene which comprises contacting ethylene with a catalyst consisting essentially of aluminum fluoride having a crystallite radius of less than about 500 Angstrom units and antimony trichloride, in the presence of an inert hydrocarbon diluent, and recovering solid polyethylene polymer therefrom.

8. The process of polymerizing ethylene which comprises contacting ethylene with a catalyst consisting essentially of aluminum fluoride, having a crystallite radius of less than about 500 Angstrom units and silicon tetrachloride, in the presence of an inert hydrocarbon diluent, and recovering solid polyethylene polymer therefrom.

9. The process of polymerizing propylene to high molecular weight polypropylene which comprises contacting propylene with a catalyst composition consisting essentially of one part aluminum fluoride having a crystallite radius of less than about 500 Angstrom units and 0.1 to 20 parts by weight of a co-catalyst selected from the group consisting of antimony pentachloride, antimony trichloride, boron trifluoride, tin tetrachloride, titanium tetrachloride, titanium trichloride, silicon tetrachloride, ferric chloride, aluminum bromide, chromium trichloride, zirconium tetrachloride, and zinc chloride.

10. The process of polymerizing propylene to high molecular weight polypropylene which comprises contacting propylene with a catalyst consisting essentially of aluminum fluoride having a crystallite radius of less than about 500 Angstrom units in the presence of an inert diluent and separating polypropylene therefrom.

11. A polymerization catalyst consisting essentially of one part by weight of aluminum fluoride having a crystallite radius of less than 500 Angstrom units together with from 0.1 to 20 parts by weight of a compound selected from the group consisting of antimony pentachloride, antimony trichloride, boron trifluoride, tin tetrachloride, titanium tetrachloride, titanium trichloride, silicon tetrachloride, ferric chloride, aluminum bromide, chromium trichloride, zirconium tetrachloride, and zinc chloride.

References Cited in the file of this patent

UNITED STATES PATENTS

| 2,085,535 | Langedijk et al. | June 29, 1937 |
|---|---|---|
| 2,195,747 | Keunecke et al. | Apr. 2, 1940 |
| 2,406,869 | Upham | Sept. 3, 1946 |
| 2,673,139 | Woolf et al. | Mar. 23, 1954 |
| 2,676,996 | Miller et al. | Apr. 27, 1954 |
| 2,709,688 | Bandes et al. | May 31, 1955 |
| 2,734,047 | Smith | Feb. 7, 1956 |
| 2,824,089 | Peters et al. | Feb. 18, 1958 |
| 2,834,768 | Friedlander | May 13, 1958 |
| 2,843,577 | Friedlander | July 15, 1958 |
| 2,878,240 | Schmerling | Mar. 17, 1959 |
| 2,891,040 | Linn | June 16, 1959 |

FOREIGN PATENTS

| 554,096 | Great Britain | June 21, 1943 |
|---|---|---|
| 796,530 | Great Britain | June 11, 1958 |

OTHER REFERENCES

Journal American Chemical Society, vol. 77, March 20, 1955, pp. 1708 and 1709.